Wentz, Green & Connor,
Candy Cutter.
No. 111,592. Patented Feb. 7, 1871.
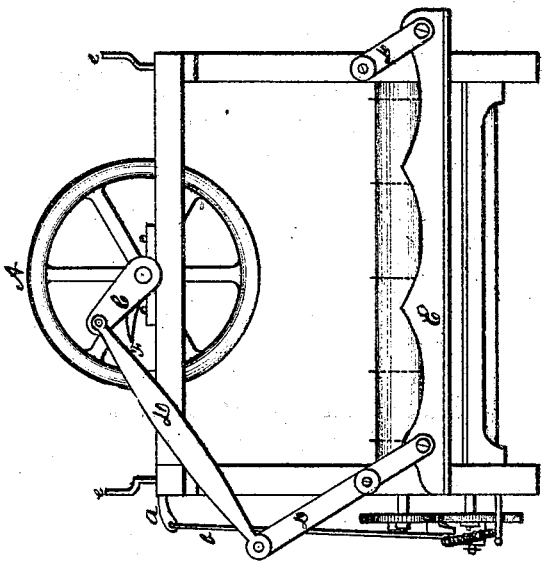
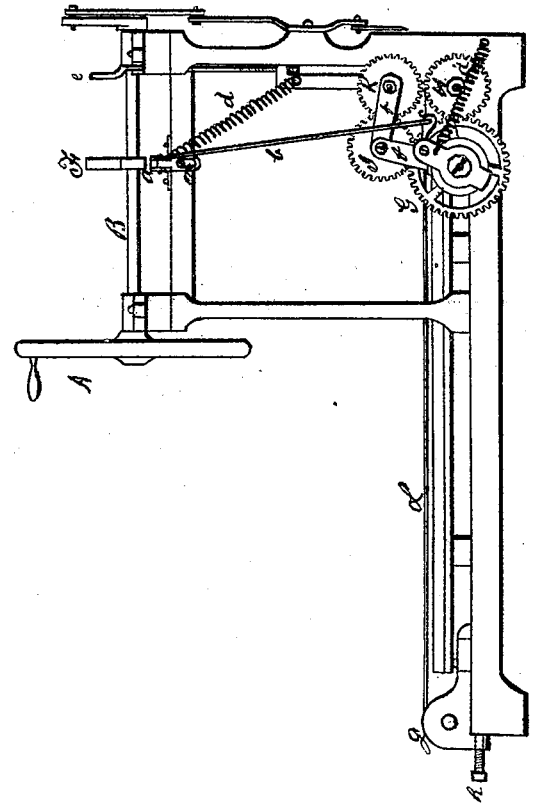
Witnesses:
Inventors:
Christopher Wentz
Albert Green
Orlando P. Connor
per Henry D. Taylor
Atty.

UNITED STATES PATENT OFFICE.

CHRISTOPHER WENTZ, ALBERT GREEN, AND ORLANDO P. CONNER, OF TRENTON, NEW JERSEY.

IMPROVEMENT IN CANDY-CUTTING MACHINES.

Specification forming part of Letters Patent No. 111,592, dated February 7, 1871.

*To all whom it may concern:*

Be it known that we, CHRISTOPHER WENTZ, ALBERT GREEN, and ORLANDO P. CONNER, of Trenton, in the county of Mercer and State of New Jersey, have invented a new and Improved Candy-Cutting Machine; and we do hereby declare that the following is a full, clear, and exact description of the same, reference being had to the accompanying drawing and to the letters of reference marked thereon.

Figure 1 represents a side view of our device. Fig. 2 is a front view.

The object of our device is to facilitate the cutting of fruit, nut, and other candies into strips of equal size and length by means of the knife, rollers, and gearing as shown in the drawing, and hereinafter described.

To enable others to make use of our invention, we will proceed to describe the same.

Similar letters of reference denote like parts in the drawing.

A is the main wheel, attached to the shaft B, which, by means of the crank C and connecting-rods D D D, imparts a downward drawing motion to the knife E. The cam F, affixed to the shaft B, operates upon the lever $a$, thus raising, by means of the rod $b$, the small lever, $c$, and rotating the gearing, as shown in Fig. 1. After the cam F leaves the lever $a$, the springs $d$ $d'$ restore the levers to their former position without affecting the gearing or rollers.

G, Fig. 1, is the main cog-wheel, operating directly upon the two cogs H and I, and through I upon the cog K, and being fixed upon the ends of the two rollers of the gearing, which are turned in opposite directions by means of the gearing and the pointed teeth on the upper or both rollers, force the candy between them and under the knife from the platform or table L, Fig. 1, and holds the sheet of candy firmly until the cam F again revolves and strikes the lever $a$.

The top roller is made adjustable by means of the screws $e$ $e$, and is prevented from being thrown out of gearing by the bands $f f$.

The bearings of the roller $g$, at the farther end of the machine, Fig. 1, are adjustable by means of the screw $h$.

The slot $m$, under the fulcrum of the lever $a$, on which the cam operates, admits of the moving of the lever for the purpose of regulating the feed, and is held in its place and graduated by a small thumb-screw.

By this arrangement fruit and nut candies, which are the most difficult to cut, can be made into even strips of a precise width, and of any size or length desired, the variation effected simply by means of the thumb-screws.

This machine takes the place of several men, is not liable to get out of order, and does its work with more exactness and precision than could possibly be accomplished by hand or the ordinary method. It can be used with or without the belt L, and is operated by one person only.

The object of the downward drawing motion to the knife is to clear the knife of any gum or candy that would otherwise adhere to it, and also to make a straight and even edge on each strip that is cut by the machine.

Having thus fully described our invention, what we claim, and desire to secure by Letters Patent, is—

1. The combination of the main wheel A, attached to shaft B, and crank C, the connecting-rods D D D forming a downward drawing motion to the knife E, substantially as herein described, for the purpose set forth.

2. The cam F, affixed to shaft B, lever $a$, rod $b$, and small lever, $c$, operating in connection with the springs $d$ $d'$, as herein set forth, for the purpose specified.

3. The main cog-wheel G, rotated by the lever $b$ and cog-wheels H, I, and K, connected with the toothed rollers, as herein shown and represented.

4. The adjustable roller K, operated by the small screws $e$ $e$, as herein shown and represented.

CHRISTOPHER WENTZ.
ALBERT GREEN.
ORLANDO P. CONNER.

Witnesses:
 CHAS. EWING,
 JOHN O. RAUM.